United States Patent Office 3,052,582
Patented Sept. 4, 1962

3,052,582
PROCESS OF CHEMICAL MILLING AND ACID AQUEOUS BATH USED THEREFOR
Herman Ben Snyder, Seattle, Wash., assignor to Boeing Airplane Company, Seattle, Wash., a corporation of Delaware
No Drawing. Filed Oct. 5, 1959, Ser. No. 844,216
3 Claims. (Cl. 156—18)

This invention relates to chemical milling and, more particularly, to chemical milling in an acid medium using principally an oxidation-reduction process.

In the past, metals have been shaped by cutting tools of various types, and the process has been known as machining or milling. However, the shapes and the tolerances required for modern airplanes, missiles, etc. have become so complex and exacting that in many cases mechanical milling methods are proving to be extremely expensive and very difficult to accomplish.

Recently, a method of milling metals by chemical means, known as "chemical milling," has been developed in which sizable selected portions of metal members are removed by chemical means. Chemical milling should be distinguished from prior chemical processes such as pickling, brightening or polishing, surface increase, and pictorial or design etching. Pickling is a process by which scale (frequently metallic oxides) is removed from the surface of metal, but as little metal as possible is removed. Brightening or polishing refers to a process in which a minimum amount of metal is removed to give a smooth or reflective surface. Surface increase is a roughening process in which a metallic surface is pitted or selectively etched, but in which only a very small amount of metal is removed. Etching in design and photoengraving and in the graphic arts in general is a process in which very small amounts, usually to a depth of a few thousandths of an inch, of metal are removed in a very precise and accurate manner. The metal removal must be sharp and vertical and the etching is a painstaking process.

Chemical milling, however, removes large quantities of metal over comparatively wide areas. For example, metal may be removed to a depth of a half an inch or more. Also the steepness or accuracy of the slope of the edge of the removal area is not critical. Chemical milling is made selective by masking the areas that are to remain and subjecting the unmasked areas to chemical attack.

Prior art methods of chemical milling involve the use of caustic (basic) etchants and more recently, acid etchants. In our work an attempt was made to chemically mill certain high alloy stainless steels such as PH 15–7 Mo, the composition of which is shown in Table III below. It was difficult with prior art methods to do a quick and adequate job of chemical milling these materials and it was not possible to provide a surface which was capable of being brazed or spot-welded. Also, in some instances, the physical properties of the metal itself have deteriorated due to the chemical milling treatment.

Accordingly, it is an object of this invention to provide an improved method of chemical milling.

It is another object of this invention to provide an improved method of chemical milling in an acid medium.

It is a further object to provide an improved method of chemical milling in an acid medium using principally an oxidation-reduction process.

It is an additional object to provide an improved method of chemical milling which may be done at a relatively uniform and controllable rate.

It is an auxiliary object to provide an improved method of chemical milling which provides a finished surface which is capable of being brazed or spotwelded.

It is a supplemental object to provide an improved method of chemical milling which does not result in a deterioration of the physical properties of the metal being milled.

It is still another object of this invention to provide an improved method of chemical milling suitable for use with steels, titanium alloys, aluminum alloys, copper alloys, "super" alloys and other metals.

It is a still further object to provide improved chemical milling baths for accomplishing the above objects.

These and other objects of this invention will be apparent from the following description.

Certain chemical milling solutions used in the prior art involve the removal of metal by acid attack. However, the components of these solutions are dangerous to handle, particularly in a manufacturing operation, and in many instances do not provide satisfactory results. Therefore, I have attempted to utilize an entirely different approach in obtaining the composition of a chemical milling solution in that the solution removes metal principally by oxidation-reduction processes. As finally evolved after considerable research, the chemical milling baths of our invention include hydrogen ion, nitrate ion, chloride ion, ferric ion, fluoride ion, acetate ion and phosphate ion; all of which are necessary and, I believe, perform specific functions as discussed below. Also the presence of an anion of a weak acid such as oxalic, citric, tartaric or boric acid is necessary.

The particular limits of the composition of the solution which we have determined after many tests are set forth in Table I.

Table I

| Materials | Ounces per Gallon |
|---|---|
| Nitrate Ion | 15–65 |
| Chloride Ion | 5–60 |
| Ferric Ion | 1–70 |
| Fluoride Ion | 1–30 |
| Acetate Ion | 1–50 |
| $HPO_4^{=}$ or $H_2PO_4^{-}$ | 0.0001–2.0 |
| Weak Acid Anion | 0.0001–6 |

Solutions within the above limits have been used to actually mill metals, the compositions of some of which are set forth in Table II.

Table II

| | C | Mn | Si | Cr | Ni | Mo |
|---|---|---|---|---|---|---|
| Low Alloy Steels: | | | | | | |
| SAE 4130 | 0.28–0.33 | 0.40–0.60 | 0.20–0.35 | 0.80–1.10 | | 0.15–0.25 |
| SAE 4340 | 0.38–0.43 | 0.60–0.80 | 0.20–0.35 | 0.70–0.90 | 1.65–2.00 | 0.20–0.30 |
| Stainless Steels: | | | | | | |
| AM 350 | 0.10 | 0.90 | 0.40 | 17.0 | 4.00 | 2.75 |
| AM 355 | 0.13 | 0.95 | 0.50 | 15.0 | 4.00 | |
| PH 15–7 Mo | 0.07 Max. | 0.60 | 0.40 | 15.0 | 7.0 | 2.25 |
| 17–7 PH | 0.07 Max. | 0.60 Max. | 0.40 Max. | 17.0 | 7.0 | |
| 17–4 PH | 0.08 Max. | 1.0 Max. | 1.0 Max. | 15.5–17.5 | 3–5 | |
| A 286 | 0.08 Max. | 1–2 | 1.0 Max. | 13.5–16.0 | 24.0–27.0 | 1.0–1.5 |
| Titanium Alloys: | | | | | | |
| 6Al–4V–Ti | 0.04 | | | | | |
| 4Al–3Mo–1V–Ti | 0.03 | | | | | 3.0 |
| 7Al–4Mo | 0.15 Max. | | | | | 3.5–4.5 |

Table II—Continued

| | P Max. | S Max. | Fe | N | Al | Ti | V |
|---|---|---|---|---|---|---|---|
| Low Alloy Steels: | | | | | | | |
| SAE 4130 | 0.040 | 0.040 | Bal. | | | | |
| SAE 4340 | 0.040 | 0.040 | Bal. | | | | |
| Stainless Steels: | | | | | | | |
| AM 350 | | | Bal. | 0.10 | | | |
| AM 355 | | | Bal. | 0.10 | | | |
| PH 15-7 Mo | | | Bal. | | 1.15 | | |
| 17-7 PH | | | Bal. | | 1.15 | | |
| | | | | Co+Ta | | | Cu |
| 17-4 PH | 0.04 | 0.04 | Bal. | 0.45 Max. | | | 3-5 |
| A 286 | 0.04 Max. | 0.04 Max. | Bal. | | 0.35 Max. | 1.75-2.25 | 0.1-0.5 |
| Titanium Alloys: | | | | | | | |
| 6Al-4V-Ti | | | 0.2 | | 6.0 | Bal. | 4.0 |
| 4Al-3Mo-1V-Ti | | | 0.04 | | 4.8 | Bal. | 1.2 |
| 7Al-4Mo | | | | | 6.0-7.5 | Bal. | |

Other metals include aluminum alloys, copper alloys, other steels, nickel base alloys, etc.

As mentioned previously, the particular problem I attempted to solve was that of successfully chemical milling a material such as PH 15-7 Mo. We have found that an excellent solution for that particular metal is that shown in Table III although other solutions within the limits set forth in Table I would be operable.

Table III

| Material | Composition Per 100 Gal. of Solution |
|---|---|
| Nitric Acid (42° Bé.) gallons | 22 |
| Hydrochloric Acid (22° Bé.) do | 8.5 |
| Ferric Chloride (42° Bé.) do | 20 |
| Acetic Acid (glacial) do | 2 |
| Hydrofluoric Acid (70%) do | 10.5 |
| Oxalic Acid ounces | 4 |
| Disodium Phosphate (Na$_2$HPO$_4$·12H$_2$O) do | 2 |
| Wetting Agent do | 5 |
| Water | Balance |

All materials tested in the above solution retained, and in some cases improved, their physical properties which in general is the case with all solutions within the limits of Table I.

It is understood, of course, that a solution within the limits set forth in Table I is operable for chemical milling all the materials mentioned but in many instances speed of milling, uniformity, surface finish, temperature and other factors will determine the particular composition of the solutions which will work the best for milling a particular material.

I have made many tests and experiments on many metals and finally determined the concentration limits as set forth above in Table I. These tests support the following conclusions. (The word "low" in the following discussion means below the concentration set forth in Table I, and the word "high" means above the concentration set forth in Table I.) If the concentration of acetate ion is too low, there will be an excessive loss of hydrogen fluoride. If the concentration of acetate is too high, the concentration of active agents is reduced.

In the chemical milling of steels, if the concentration of fluoride ion is too low, the steel tends to passivate. If the concentration of fluoride ion is too high, the capacity of the dissolved metal remaining in solution is reduced. In the case of the titanium alloys and aluminum alloys, if the fluoride ion is too low, the milling rates become low whereas if the fluoride ion concentration is too high, there are very high milling rates which lead to high surface roughness and high hydrogen pickup. If the nitrate ion concentration is too low when chemically milling steel, there is a low milling rate and a high surface roughness. If the nitrate ion is too high, all metals including steel, titanium alloys and aluminum alloys tend to passivate. If the nitrate ion concentration is too low, with titanium alloys and aluminum alloys there are very high milling rates with high surface roughness and high hydrogen pickup. If the concentration of the chloride ion is too low in steel, there tends to be no milling. With titanium alloys there is lack of control of the solution, and with aluminum alloys there is a very rough surface and a low milling rate. If the concentration of chloride ion is too high, steel has a tendency to passivate and large quantities of smut are formed. With titanium alloys high concentration of chloride ion results in a decrease in solution control and an increase in surface roughness. With aluminum alloys, high chloride ion concentration results in a very rough surface and a very high milling rate and considerable formation of smut. If the concentration of the weak acid anion is too low, with steel there is formed an adherent powder precipitate on the parts being milled and there is a poor milling rate control. With titanium and aluminum alloys, the low weak acid anion concentration leads to poor milling rate control. If the weak acid anion concentration is too high when used to mill steel, the solution capacity for retaining dissolved metal is reduced. If the ferric ion concentration is too low, steel tends to have low milling rates with passivation and increased roughness. If the ferric ion concentration is too high when used to chemically mill steel, the solution has a decreased capacity. With aluminum and titanium alloys, a high ferric ion concentration increases the surface roughness. If the concentration of the phosphate ion is too low, there tends to be a poor milling rate control. If the concentration of the phosphate ion is too high, with steel there tends to be an adherent precipitate formed in the parts being milled, and with titanium and particularly aluminum alloys, there is increased surface roughness.

As mentioned above, I believe that each of the ions of my solutions performs a definite function, and I have found that if any of these ions are omitted from the solution, satisfactory results are not obtained. While I do not wish to be limited to my present beliefs and do not wish to have my invention stand or fall on my concept of the functions of the various components of the solutions involved, I do feel that the following functions of these components are correct.

In particular, I believe that the theory relating to the chemical milling of the steels is as follows. The fluoride ion performs the functions of activating the surface of the metal to be milled so that the reaction will take place in the desired manner.

The fluoride ion also has another valuable function. In chemical milling processes frequently a material known as smut is formed, which actually clings to the metal itself. This smut is usually an oxide of the metal being milled, or is a chemical compound of that metal with solution components or unreacted finely divided particles of the base alloy. The smut is usually attracted to the base metal by electrochemical and/or electrostatic forces.

We have found that the fluoride ion acts as a "smut conditioner" and that with the fluoride ion in the solution, the smut can be easily removed by rinsing. However, if the fluoride ion is not present in the quantity set forth in Table I, the smut is very difficult to remove and frequently interferes with the milling action. If the fluoride ion is present in a quantity above that set forth in Table I, the attack on the metal to be milled becomes too violent to control properly.

The ferric ion is necessary to the solution because it is the medium through which the principal oxidation-reduction action takes place. In steel the elemental iron in the metal being milled is oxidized to ferrous ion while the ferric ion is reduced to ferrous ion. Without the ferric ion, a true oxidation-reduction type metal removal would not be possible.

The nitrate ion performs a function of oxidizing agent in the milling solution and breaks down during the milling operation thereby forming NO, $NO_2$, $N_2O_3$, and $N_2O_5$ gases which dissolve in the solution and contribute to the oxidation potential of the solution. These gases react with the chloride ion to form NOCl and/or $NO_2Cl$ complexes which in turn react with the ferrous ion to form FeOCl. The nitrate ion also reacts with the ferrous ion and the fluoride ion to form a complex.

If insufficient weak acid anion, such as oxalate ion is available, a precipitate forms which is very fine and appears to be a mixture of ferric oxide and ferric fluoride and which is practically insoluble under the conditions of the bath. If this precipitate is formed on the part to be milled it will interfere with the milling process. However, the presence of sufficient oxalate ion will form a metal organic fluoride complex and will prevent the ferric oxide-ferric fluoride precipitate from forming.

The acetate ion forms a loosely bonded compound with the fluoride ion which is less volatile than the fluoride, particularly when it is in the form of hydrogen fluoride and thereby reduces the loss of hydrogen fluoride by evaporation. I have found that if the acetate ion concentration is below that set forth in Table I, there is an excessive loss of hydrogen fluoride from the solution. If the acetate ion concentration is above that set forth in Table I, the concentration of active agents in the solution is reduced.

The weak acid anion, such as oxalate, and the acetate ion form various complexes (such as metal-organic-fluoride) with the other chemicals of the solution. These complexes then disassociate and provide chemicals to the reaction as they are needed. This action of the organic acids combined with the action of the di-hydrogen phosphate ion or hydrogen phosphate ion tends to keep the milling rate constant while large amounts of metal are being removed. This is in contrast with the ordinary action without these materials in which the milling rate gradually declines, thus making it difficult to maintain accurate milling. As a specific example, with the composition set forth in Table II at a temperature of 120° F. the milling rate for PH 15–7 Mo is 0.9 mil per side per minute. Without any additions of chemicals and with a constant temperature, the milling rate will stay constant at approximately 0.9 mil per side per minute while about ⅜ of a pound of metal is dissolved into one gallon of solution. With additions of nitric acid and hydrochloric acid, up to 1½ pounds of metal can be dissolved per gallon of solution while the milling rate remains practically constant.

The acetic acid-hydrofluoric acid concentration determines the amount of ferric ion, chromic ion or nickelous ion that can stay in the solution. Therefore, it can be seen that the acetic acid-hydrofluoric acid concentration may be used in controlled "de-sludging" of the solution, that is, the amount of precipitate or "sludge" formed may be controlled to remove these ions at certain predetermined times. Also the balance between the nitrate ion and the chloride ion concentration is important for obtaining good surface smoothness (as low as 15 R.M.S. for the steels and 4 R.M.S. for the titanium alloys. The smoothness of milled metal is expressed in "root mean square" terms, abbreviated R.M.S., and the unit of measurement is micro-inches of amplitude of surface variation).

I have found that usually the oxalate ion is to be preferred as the weak acid anion used (on the steels as well as on the other metals disclosed), although other weak acid anions such as tartrate, citrate and borate have been and found to be satisfactory.

We have found that a wetting agent such as an alkyl benzene sodium sulfonate or an organic alkyl aryl sulfonate is frequently desirable in order to reduce the surface tension of the solution which in turn prevents the pitting of uneven milling rates and a process known as "gas cutting." If a wetting agent is not utilized, frequently gas bubbles form on the surface of a metal which prevent that portion of the surface of the metal, thereby causing the formation of an uneven or pitted surface.

As pointed out previously, this solution reacts primarily in an oxidation-reduction manner, and is not an acid-type action. This is indicated by the fact that only 10%–25% of the theoretical volume of gas is released and that only 80% of this gas is hydrogen. Furthermore, from 2% to 4% of the released gas is carbon dioxide and the remainder is made up of the oxides of nitrogen from $N_2O$ to $N_2O_5$.

The theory of the solution action on titanium and aluminum alloys is very similar to that for steel in that the principal chemical action is oxidation-reduction. This is shown by an analysis of the gases produced during milling. Only 10%–15% of the theoretical volume of gas is released and of that, only 85% is hydrogen, the remainder being $N_2O$, NO, $NO_2$, $N_2O_3$ and $CO_2$ with a trace of $N_2O_5$. It should be noted that with the steels $N_2O$ is almost absent while the $N_2O_5$ content is fairly high. The particular ions act as follows: The fluoride ion attacks the metal. The nitrate ion tends to "passivate" the metal. The nitrate ion with the chloride ion forms NOCl and/or $NO_2Cl$ which attacks some of the alloying particles and aids in even milling. The acetic acid stabilizes the hydrofluoric acid by forming a complex which reduces the volatility of the hydrofluoric acid and prevents its removal of the solution.

The weak acid anion and the di-hydrogen phosphate or hydrogen phosphate form a complex with the metal and the metallic fluoride which is formed after the fluoride ion attack on the metal. Also the materials resulting after the NOCl and/or $NO_2Cl$ attack on the alloying particles are involved in this complex. The complex tends to form a controlling film on the surface of the metal which is probably the factor that causes the milling rate to remain constant for prolonged periods of time and even though there are large differences in dissolved metal concentration. In the case of titanium this film or precipitate appears to be a Ti-O-F and a Ti-organic-F.

Although aluminum alloys can be milled satisfactorily by the bath used in this invention, the smoothness is only approximately 100 R.M.S. which, though comparatively rough, is satisfactory for many operations.

The ions of my solution may be obtain from the chemical materials set forth in Table III or from other chemicals so long as the action of the desired ions are not interfered with by the addition of undesirable ions.

This solution should be operated at a temperature between 50° F. and 160° F. It should be noted that the temperature utilized has a considerable effect on the milling rate and therefore it is found desirable to keep the temperature constant within about ±2° F. during the milling operation in order to obtain the best utilization of the uniform milling rate characteristics of the solution. However, operating to within ±5° F. will give satisfactory results.

In actual operation a part to be chemically milled is cleaned and degreased in order to remove adhering oils, greases, and other surface contaminants. The part is then covered by a suitable maskant such as the known neoprene, butyl, or vinyl materials. In some instances a photo-sensitive material such as polyvinyl alcohol may be utilized. The desired portions of the maskant are removed by mechanical means or by photographic means and then the part is immersed in the milling solution. The milling solution attacks the unmasked portions of the metal part.

My solution provides a quite uniform milling rate and therefore the depth of the material removed may be accurately controlled. However, in order to obtain uniform milling, the concentration of the solution should be constant and should not vary within the different portions of the tank. Therefore, agitation of the solution is required. This agitation should be non-directional (such as that provided by a rolling motion) and must be great enough to prevent local variations of concentration and temperature. Also the agitation must be controlled in order to prevent excessive part oscillation and/or excessive surface movement of the solution with a course the attendant losses and/or foaming. The agitation may be provided by bubbling air through the solution or by suitable mechanical means.

I have also found that it is desirable for the part itself to be agitated for good uniform results. This agitation will minimize or prevent gas cutting and so called "dishing" (etching on a part of the metal more than desired, for example in the form of a dish). Also the part agitation minimizes the problem which is sometimes caused by scratches on the surface, namely the milling in some instances may retain the scratch by etching the scratched portion at the same rate as the other portion. This part agitation tends to remove many existing scratches and provides a smooth surface. The part agitation also gives greater surface smoothness and permits the attainment of closer tolerances.

My solution gives excellent line definition when proper agitation is used and the life of the solution is quite long. Also the milling rate as mentioned previously remains constant through the life of the solution. Specifically, we have found that over 1½ pounds of metal can be removed per gallon of solution before the milling properties are affected.

The aged solution occasionally will need additional replenishing besides normal solution maintenance, to maintain the etch rate. This may be done by adding nitric acid, hydrochloric acid, and hydrofluoric acid to compensate for the evaporation, "drag-out" and for other losses of the chemicals involved. As a specific example, in conjunction with the solution set forth in Table II, I have found that 3.4 gallons of nitric acid (42° Bé.), and 2.5 gallons of hydrochloric acid (22° Bé.), and 1.2 gallons of hydrofluoric acid (70%) should be added per 1,000 square foot mils of metal dissolved (or stated in another way: 8 gallons of nitric acid, 6 gallons of hydrochloric acid and 3 gallons of hydrofluoric acid per 100 lbs. of metal dissolved).

While the present invention has been shown in a few forms only, it will be obvious to those skilled in the art that it is not so limited but is susceptible to various changes and modifications without departing from the spirit and scope thereof.

I claim as my invention:

1. An acid aqueous bath for chemically milling principally by an oxidation-reduction process, said bath including the following as essential ingredients: hydrogen ion, from 1 to 70 ounces per gallon of ferric ion, from 5 to 60 ounces per gallon of chloride ion, from 1 to 30 ounces per gallon of fluoride ion, from 15 to 65 ounces per gallon of nitrate ion, from 0.0001 to 6 ounces per gallon of a weak acid anion, from 1 to 50 ounces per gallon of acetate ion, and from 0.0001 to 2.0 ounces per gallon of a phosphate ion selected from the group consisting of $H_2PO_4^-$ and $HPO_4^{--}$.

2. An acid aqueous bath for chemically milling principally by an oxidation-reduction process, said bath including the following as essential ingredients: hydrogen ion, from 1 to 70 ounces per gallon of ferric ion, from 5 to 60 ounces per gallon of chloride ion, from 1 to 30 ounces per gallon of fluoride ion, from 15 to 65 ounces per gallon of nitrate ion, from 0.0001 to 6 ounces per gallon of oxalate ion, from 1 to 50 ounces per gallon of acetate ion, and from 0.0001 to 2.0 ounces per gallon of a phosphate ion selected from the group consisting of $H_2PO_4^-$ and $HPO_4^{--}$.

3. A method of chemically milling an article principally by an oxidation-reduction process, said method including the steps of treating said article in an acid aqueous chemical milling bath including hydrogen ion, from 1 to 70 ounces per gallon of ferric ion, from 5 to 60 ounces per gallon of chloride ion, from 1 to 30 ounces per gallon of fluoride ion, from 15 to 65 ounces per gallon of nitrate ion, from 0.0001 to 6 ounces per gallon of oxalate ion, from 1 to 50 ounces per gallon of acetate ion, and from 0.0001 to 2.0 ounces per gallon of a phosphate ion selected from the group consisting of $H_2PO_4^-$ and $HPO_4^{--}$.

References Cited in the file of this patent

UNITED STATES PATENTS

| | | |
|---|---|---|
| 1,939,241 | Taylor | Dec. 12, 1933 |
| 2,266,430 | Matthews | Dec. 16, 1941 |
| 2,572,228 | Whyzmuzis | Oct. 23, 1951 |
| 2,806,000 | Streicher | Sept. 10, 1957 |
| 2,809,138 | Wagner | Oct. 8, 1957 |
| 2,890,944 | Hays | June 16, 1959 |
| 2,940,838 | Snyder et al. | June 14, 1960 |
| 2,981,610 | Snyder et al. | Apr. 25, 1961 |